(12) United States Patent
Quintile

(10) Patent No.: US 7,223,044 B2
(45) Date of Patent: May 29, 2007

(54) DOOR FRAME MITER BRACE

(75) Inventor: Mark J. Quintile, Brunswick, OH (US)

(73) Assignee: Anchor Tool & Die Company, Cleveland, OH (US)

( * ) Notice: Subject to any disclaimer, the term of this patent is extended or adjusted under 35 U.S.C. 154(b) by 69 days.

(21) Appl. No.: 10/745,236

(22) Filed: Dec. 22, 2003

(65) Prior Publication Data

US 2005/0135877 A1   Jun. 23, 2005

(51) Int. Cl.
*E04G 7/00* (2006.01)
(52) U.S. Cl. ............... 403/402; 403/205; 403/401; 403/403; 248/300; 52/656.9
(58) Field of Classification Search ......... 403/205, 403/401, 402, 403; 49/504; 52/656.9; 248/300, 248/220.21
See application file for complete search history.

(56) References Cited

U.S. PATENT DOCUMENTS

| | | | | | |
|---|---|---|---|---|---|
| 4,222,209 | A | * | 9/1980 | Peterson | 52/172 |
| 4,240,765 | A | * | 12/1980 | Offterdinger | 403/402 |
| 4,570,406 | A | * | 2/1986 | DiFazio | 52/656.9 |
| 5,485,705 | A | * | 1/1996 | Guillemet | 52/656.9 |
| 5,881,525 | A | * | 3/1999 | Riegelman et al. | 52/656.7 |
| 5,921,056 | A | * | 7/1999 | Weiss et al. | 52/656.9 |
| 6,119,416 | A | * | 9/2000 | Larson | 52/212 |

OTHER PUBLICATIONS

Deansteel Manufacturing Company Inc., San Antonio, Texas, pp. 1-11.

\* cited by examiner

*Primary Examiner*—Daniel P. Stodola
*Assistant Examiner*—Michael P. Ferguson
(74) *Attorney, Agent, or Firm*—Roetzel & Andress

(57) ABSTRACT

A frame member miter guide or brace has first and second legs configured for insertion and engagement with adjoining frame members at a mitered joint, the miter guide having a stop with stop edges which accurately position intersecting walls of the frame members for precise alignment of the mitered joint. Stop edges of the stop correspond with the correct positions of the frame members, so that the members are held in place for final attachment and installation. Positive engagement of edges of the frame member walls with the stop edges insures highly accurate orientation of the mitered joint. A fracture line for welded installation of the frame members, and a leg profile which minimizes damage in handling and installation is also described.

5 Claims, 3 Drawing Sheets

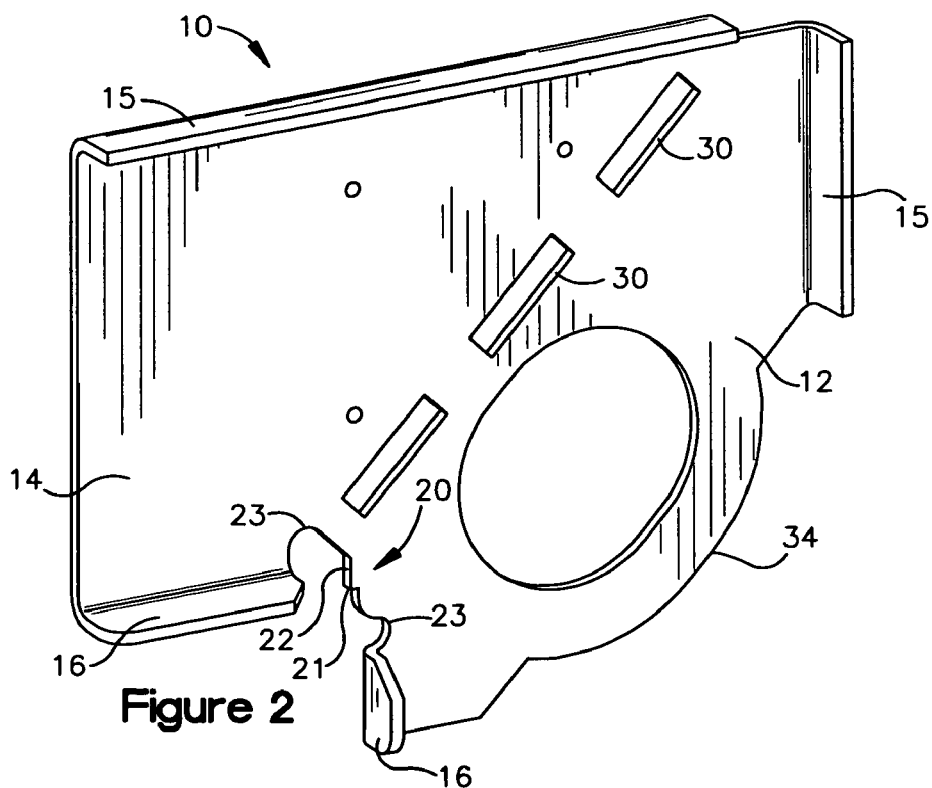
Figure 2
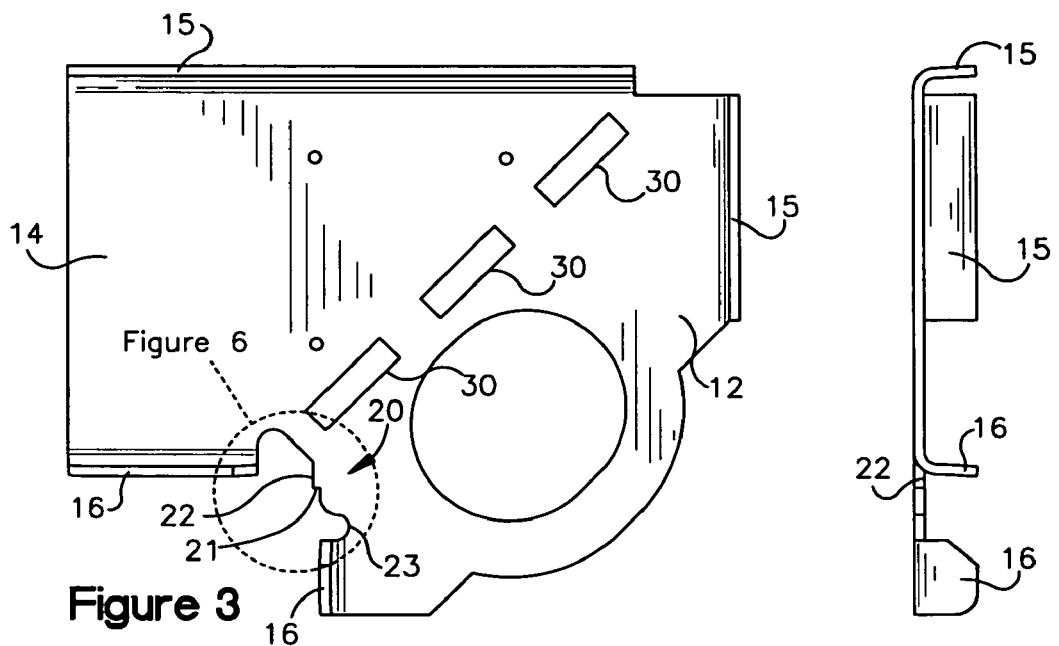
Figure 3
Figure 5
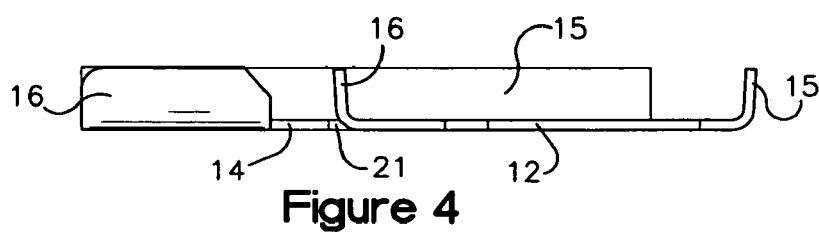
Figure 4

DOOR FRAME MITER BRACE

FIELD OF THE INVENTION

The present invention pertains generally to hardware and fastener components, and more particularly to hardware and fastener components which are used in building construction applications.

BACKGROUND OF THE INVENTION

In architectural applications and building construction there are frame structures for doorways, windows or other openings formed by frame members which must be assembled at right angles. Precise angles are required whereby the mating edges provide a hairline joint having a permanent neat and trim appearance. Many of the fastening devices currently being used at the junction of the members are generally inadequate to provide proper alignment or positive engagement with one another.

One example of such a fastening device is described in U.S. Pat. No. 3,552,085, which includes a corner clip which works in cooperation with jamb anchors to establish a frame miter. For example the use of a triangular piece at the intersection of right angle frame pieces allows the ends of the pieces to move along the angled surface of the insert piece, so that there is no fixed orientation of a mitered joint as is required in most frame assemblies prior to installation. This is particularly problematic in that it requires extra time, care and skill during installation by the workmen in achieving the common right angle joint for proper fit appearance when complete.

SUMMARY OF THE INVENTION

The present invention overcomes these and other disadvantages of prior art frame assemblies by providing a frame miter brace which ensures proper alignment and registration of adjoining frame members for ease of installation and assembly. The frame miter brace of the invention also serves as an assembly jig by which intersecting frame members are accurately aligned and held prior to being welded together into a one piece assembly.

In accordance with one aspect of the invention, a frame miter brace has a generally planar body with a first extension configured for internal engagement with a first frame member, and a second extension configured for insertion with a second frame member intersecting with the first frame member, the first and second extensions being angularly disposed relative to the angle of intersection of the first and second frame members, flanges which extend from parallel edges of the first and second extensions, the flanges providing opposed surfaces for internal alignment with a respective frame member, a miter guide at an intersection of the first and second extensions, the miter guide having a first contact edge for contact by a terminal end of a first frame member into which the first extension is inserted, and a second contact edge for contact by a second frame member into which the second extension is inserted, the first contact edge being angularly disposed relative to the second contact edge.

In accordance with another aspect of the invention, a frame miter brace has a body from which extends a first leg and a second leg, the first leg configured to fit within a first frame member, and the second leg configured to fit within a second frame member, each of the first and second legs having at least one flange configured to face an interior surface of a frame member; a stop formed proximate to an intersection of the first and second legs, the stop having first and second stop edges positioned for respective contact with edges of the first and second frame members when the miter brace is fully engaged with first and second frame members, the miter brace maintaining a mitered intersection of the first and second frame members when the are engaged with the miter brace and in contact with the stop edges.

These and other aspects, features, innovations and variations of the invention are herein described in detail with reference to the drawing Figures.

DESCRIPTION OF THE FIGURES

FIG. 2 is a perspective view of a door frame miter brace of the present invention;

FIG. 3 is a plan view of a door frame miter brace of the present invention;

FIG. 4 is a side view of the door frame miter brace of FIG. 3;

FIG. 5 is a side view of the door frame miter brace of FIG. 3;

DETAILED DESCRIPTION OF PREFERRED AND ALTERNATE EMBODIMENTS

Figure 1:
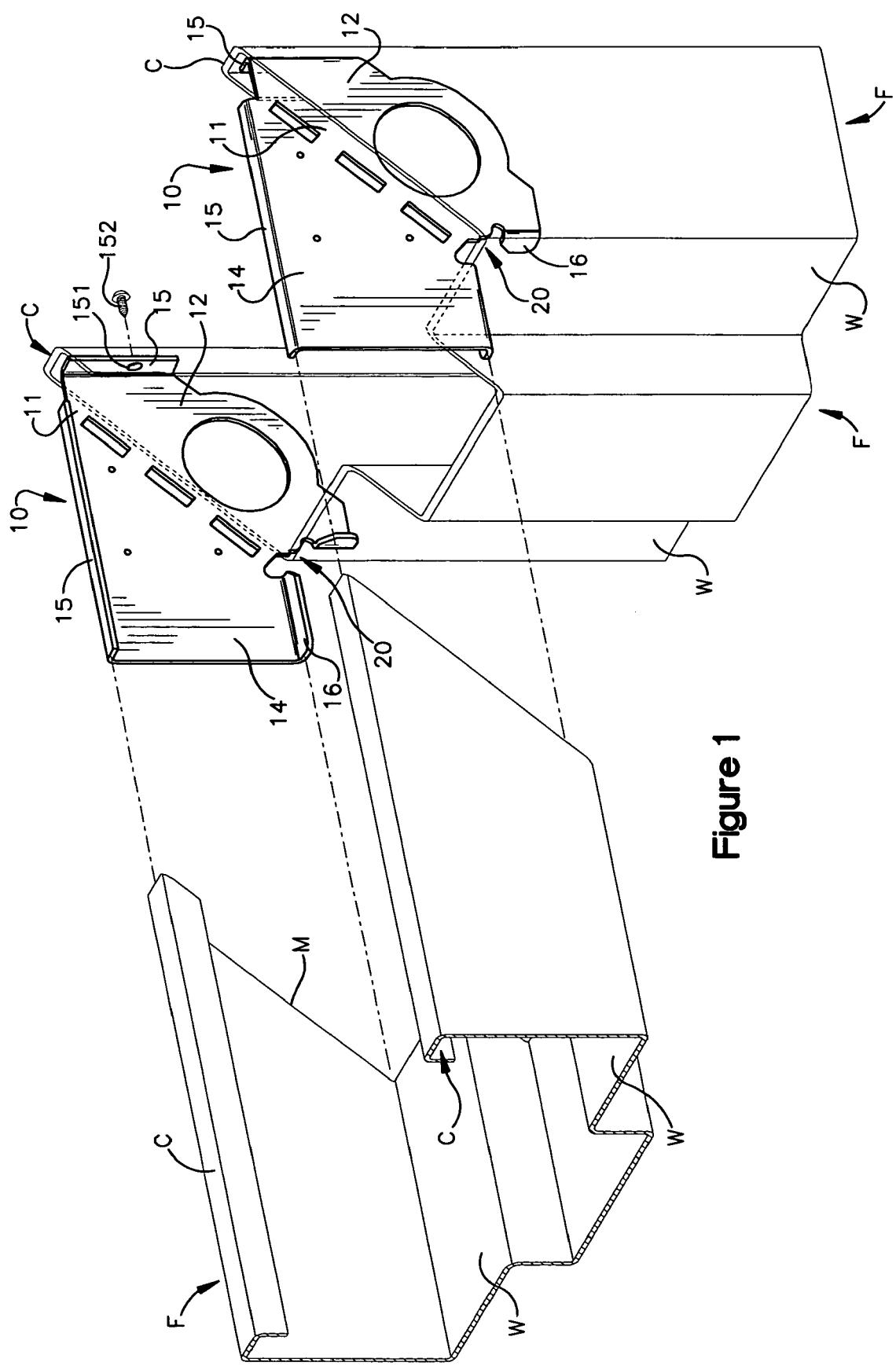
FIG. 1 is a perspective view of a pair of door frame miter braces of the present invention.

As shown in the Figures, a frame miter brace or guide, indicated generally at 10, for placement at a mitered joint or intersection of frame members, such as frame members used to define an opening such as a doorway, window or other type of opening, has a body 11 with a first leg 12 and a second leg 14, the first and second legs generally extending in orthogonal directions, though other angular orientations of the legs are contemplated by the invention. The body 11 is generally planar, as shown in FIGS. 4 and 5, but can be made in different cross-sectional thicknesses. As shown in FIG. 1, the legs 12 and 14 are configured to fit frame members F which intersect to from a door or window frame or other structure. More specifically, flanges 15 and 16 are formed at the edges of opposing sides of the legs 12, 14, with a major flange 15 configured to fit within channel C of the frame members, and a minor flange 16 configured to contact the jamb wall W of the frame member. In the embodiment shown, flanges 15 and 16 are formed to extend perpendicularly from opposing edges of the legs 12 and 14, thereby providing opposing surfaces which contact or bear against the interior surfaces of the channels C and the opposing wall W of frame members F. As known in the art, the opposing flanges 15, 16 of the legs 12, 14 can be dimensioned to provide an interference fit with the corresponding frame member F between the channel C and wall W, by for example a slight flair of the flanges 15, 16 outward from perpendicular to the plane of legs 12, 14. With this type of interference fit of the miter brace 10 inside the receiving end of a frame member F, the miter brace is self-fixturing, meaning that it holds itself in position within the frame member F throughout the frame installation and assembly process in a door opening. This completely eliminates any need for a jig to install the miter brace within a frame member and hold it in place prior to and during frame assembly.

Figure 6A:
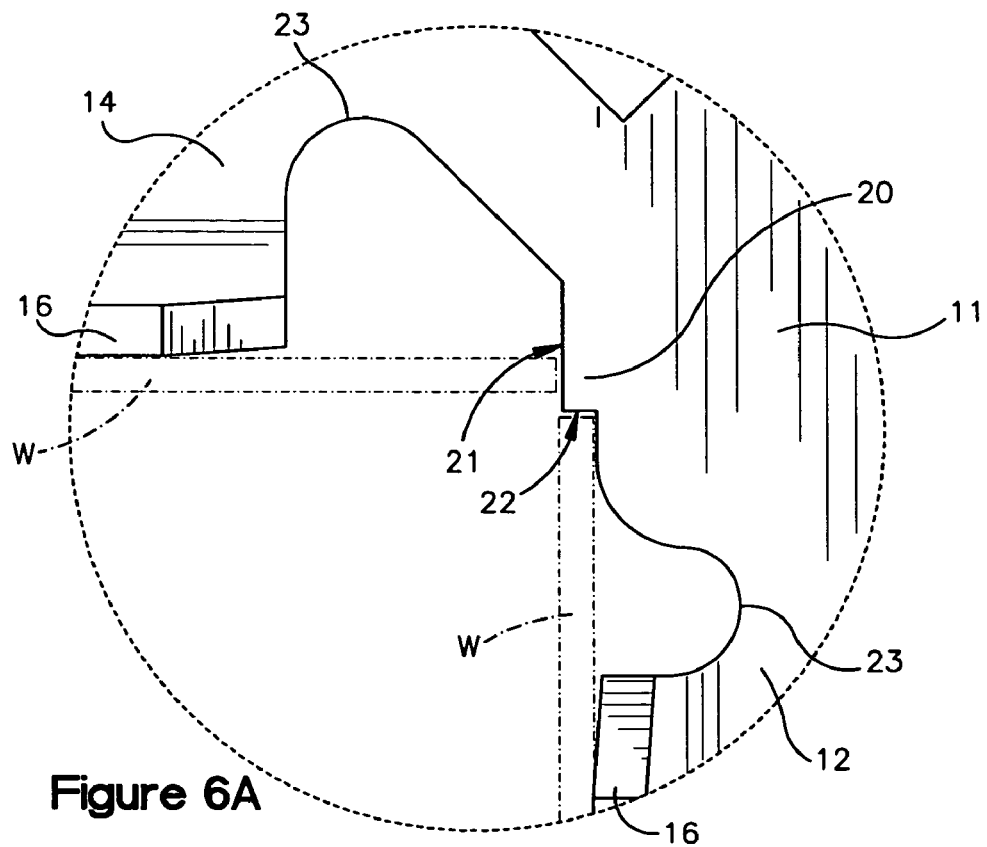
FIG. 6A is a view of the area of the door frame miter brace as noted on FIG. 3.

Because the legs 12 and 14 are arranged at a right angle for a typical door frame assembly, the extent to which the legs are inserted into the corresponding frame member is critical to achieve a right angle frame, and to create miter with a tight seam. A stop 20 is formed in the body 11 of the miter brace 10 at an interior corner of the body, proximate to the intersection of the legs 12 and 14 and proximate to the minor flanges 16 which extend from legs 12, 14. An end edge of wall W contacts the stop 20 when the leg 12 or 14 is inserted into the frame member F as shown in FIG. 1. As shown in greater detail in FIG. 6A, the stop 20 has a first edge 21 which faces wall W of leg 14, and a second edge 22 which faces wall W of leg 12. In a preferred embodiment as shown, the edges 21, 22 are perpendicular to the plane in which the respective walls W lie, and with the facing edges of the walls W squared-off so as to be parallel with the stop edges 21, 22, as shown. The stops 21, 22 are placed to accurately align the mitered edges M of the frame members F to insure that the frame members F are positioned at a right angle (or the angle of the miter brace which may be something other than 90 degrees). Stop edge 21, for example, extends from one side of the contacting edge of frame wall W to an opposite side of frame wall W, so that it is not possible for the edge of frame wall W to extend beyond stop edge 21. Once the edge of frame wall W is in contact with stop edge 21, it is not possible for the edge of the mating frame wall W (about leg 12) to travel beyond stop edge 22. The accurate positioning of the stop edges 21, 22 insures that the contacting edges of walls W are positively engaged and have no other position to assume when the leg 12 or 14 is fully inserted into the frame member F. Thus there is no possibility for positioning error. By this construction, the miter brace 10 is accurately engaged and registered within the distal ends of the frame members F. Thus held the frame members F can then be fastened or otherwise fixed in this relative position. One type of additional fastening or securement of the mitered intersection is shown in FIG. 1 in the form of a screw fastener 152 which passes through the frame channel C to be received in a hole 151 in flange 15 of leg 12. Other fastener applications about the intersection can be employed in this manner.

Figure 6B:
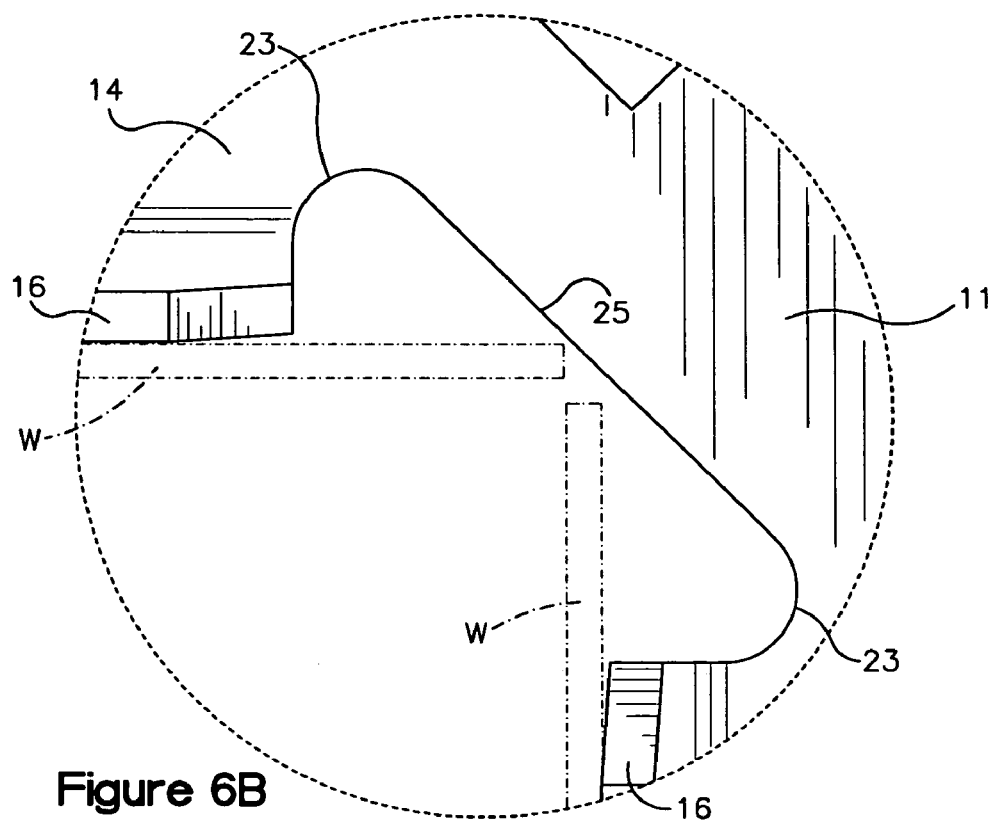
FIG. 6B is an alternate embodiment of the area of the door frame miter brace as noted on FIG. 3.

FIG. 6B illustrates an alternate embodiment of the miter brace 10 which has an angled edge 25 which extends generally between legs 12 and 14 to provide an angled contact surface for the abutting ends of the respective frame walls W as shown. This embodiment is particularly suitable for use with close tolerance frame members with accurate mitering which will align when the ends of the frame walls W contact edge 25, as shown. In this design also there is no possibility that the frame walls W can travel beyond the contact edge 25 to create a mis-alignment of the mitered corner. The recessed areas 23 are spaced from the segment of the contact edge 25 which the edges of frame walls W contact.

When fabricated of stamped metal, the relief zones or cut-outs 23 proximate to but spaced from stop 20 facilitate accurate stamping of the miter brace 10 with a reduced amount of stamping die maintenance to continuously achieve well-defined stop edges 21, 22 necessary for the described performance of the brace. Because the relief zones or cut-outs 23 are spaced from stop edges 21, 22, the edges of the frame walls W which do not exactly align with the stop edges 21, 22 cannot enter into the relief zones or cut-outs 23. Therefore, misalignment of the frame miter is avoided. Openings 30 are provided to define a breakaway line along which the brace 10 can be separated for welded installation of the assembly. The rounded end 34 of leg 12 reduces damage to the brace 10 which can otherwise occur in handling and installation. An opening 32 can also be formed in leg 12 as shown.

Although described with reference to a single preferred embodiment, the design concepts embodied within represent the proper scope of the invention, such that obvious variants on choice of material, alternate configurations of the legs and leg flanges, and the stop and stop edges are all within the scope of the claims and equivalents.

What is claimed as the invention is:

1. A frame miter guide for placement at a mitered joint of frame members, the miter guide comprising:

a planar body and a first leg and a second leg in the same plane as the planar body, the first leg and second leg being perpendicular, each of the legs configured to fit within a frame member, each leg having at least one flange configured to face and contact an interior surface of a frame member into which it is inserted, the at least one flange located at an edge of the leg and perpendicular to the plane of the leg, a stop located proximate to an intersection of the legs, the stop having a first stop edge on the first leg positioned to face an edge of a wall of a first frame member, and a second stop edge on the second leg positioned to face an edge of a wall of a second frame member, the legs and stop edges defining an angular orientation of the first and second frame members when the walls of the respective frame members are engaged with the legs of the miter guide and the edges of the walls are in contact with the stop edges, wherein the first and second legs are of different lengths and the flanges of the first and second legs are of different lengths, wherein the stop is located proximate to ends of the flanges of the legs and wherein the stop edges are perpendicular to each other, the body further comprising a recessed area between the flange of each of the legs and the stop, and a fracture line between the legs of the guide.

2. A frame miter guide comprising:

a planar body having:

a planar first leg in the same plane as the body, the first leg having parallel and spaced apart and opposed flanges which extend perpendicularly out of the plane of the first leg, and a round end between the flanges of the first leg, a stop edge located in the plane of the first leg and next to and lateral of one of the flanges of the first leg, and a recess between the stop edge and one of the flanges of the first leg;

a planar second leg in the same plane as the body, the second leg having parallel and spaced apart and opposed flanges which extend perpendicularly out of the plane of the second leg, a stop edge located in the plane of the second leg and next to and lateral of one of the flanges of the second leg, a straight edge between the flanges of the second leg, and a recess between the stop edge and one of the flanges of the second leg.

3. The frame miter guide of claim 2 wherein the stop edges are immediately adjacent and perpendicularly arranged relative to each other in the plane of the body.

4. The frame miter guide of claim 2 wherein the stop edges are angularly disposed relative to the first and second legs.

5. A mitered frame comprising:

a first frame member having a channel and a second frame member having a channel, ends of the first and second frame members cut at forty-five degrees to form a mitered joint at a ninety degree intersection of the two frame members;

a miter brace having:
  a planar body which fits within the channels of the frame members,
  the body having: a first leg in the same plane as the body, the first leg having opposed spaced apart flanges at edges of the leg, the flanges being perpendicular to the plane of the body and;
  a second leg in the same plane as the body and in a direction perpendicular to the first leg, the second leg having opposed spaced apart flanges at edges of the leg, the flanges being perpendicular to the plane of the body and leg;
  the first leg having a length greater than the second leg;
  a stop formed in the plane of the body proximate to an intersection of the first leg and second leg, the stop having first and second stop edges which are immediately adjacent and perpendicular to each other and which lie in the plane of the body, the first stop edge contacting an edge of the first frame member with the first leg of the miter brace inserted into the channel of the first frame member, the second stop edge contacting an edge of the second frame member with the second leg of the miter brace inserted into the channel of the second frame member, and recessed areas proximate to the first and second stop edges.

* * * * *